United States Patent [19]

Kotera

[11] Patent Number: 4,674,126

[45] Date of Patent: Jun. 16, 1987

[54] IMAGE SIGNAL PROCESSING APPARATUS

[75] Inventor: Masahide Kotera, Yokohama, Japan

[73] Assignee: Canon Kabushiki Kaisha, Tokyo, Japan

[21] Appl. No.: 647,157

[22] Filed: Sep. 4, 1984

[30] Foreign Application Priority Data

Sep. 12, 1983 [JP] Japan .................................. 58-168548
Sep. 12, 1983 [JP] Japan .................................. 58-168549
Sep. 12, 1983 [JP] Japan .................................. 58-168550

[51] Int. Cl.⁴ ............................................. H04N 1/40
[52] U.S. Cl. ...................................... 382/53; 358/282
[58] Field of Search ........................... 382/53; 358/282

[56] References Cited

U.S. PATENT DOCUMENTS

| 4,064,484 | 12/1977 | Mese et al. | 382/53 |
| 4,228,468 | 10/1980 | Nagano | 382/53 |
| 4,247,873 | 1/1981 | Decuyer | 382/53 |
| 4,446,846 | 5/1984 | Itoh | 382/53 |
| 4,468,704 | 8/1984 | Stoffel et al. | 382/53 |
| 4,481,666 | 11/1984 | Niwa | 382/53 |
| 4,525,747 | 6/1985 | Sakai et al. | 382/53 |
| 4,539,600 | 9/1985 | Takahashi et al. | 382/53 |
| 4,562,486 | 12/1985 | Suzuki et al. | 382/53 |

Primary Examiner—Howard A. Birmiel
Attorney, Agent, or Firm—Fitzpatrick, Cella, Harper & Scinto

[57] ABSTRACT

An image signal processing apparatus has a CCD for reading an image, a peak detector circuit for detecting a peak value of changes in an analog image signal received from the CCD, a slice level memory circuit for storing a fixed slice level, a comparator, and a slice level change circuit for setting a proper slice level for the image signal. Thickening of a character image or the like is prevented, allowing satisfactory readout of a microfilm image.

22 Claims, 3 Drawing Figures

IMAGE SIGNAL PROCESSING APPARATUS

BACKGROUND OF THE INVENTION

1. Field of the Invention

The present invention relates to an image signal processing apparatus which binary encodes an analog image signal, for example, obtained by scanning an image, and produces a digital image siganl.

2. Description of the Prior Art

It is already known how to photoelectrically read an image, perform electrical processing of an obtained image signal, and transmit or store the obtained image signal.

Electrical processing of an image of a microfilm has also been proposed. According to this electrical processing, a microfilm is irradiated with light from a light source. Light which is transmitted through the microfilm is focused on a light-receiving surface of an image sensor (e.g., a CCD image sensor or the like, to be referred to as a CCD hereinafter to perform photoelectric conversion. Thus, an image of the microfilm is obtained as an analog signal. The obtained analog signal is converted into a binary image signal.

When the analor signal obtained from the CCD is binary encoded, a method is generally adopted wherein the obtained analog signal is compared with a reference fixed potential. This reference fixed potential is called a slice level. However, with such a method, a correct digital image signal is difficult to obtain, for the following reasons. In other words, in some images, the range of gray level changes falls above or below the fixed potential, so that these changes cannot be detected with reference to such a reference fixed potential. When a CCD is used, the amount of light received by the CCD is generally obtained as a product of the amount of light output by light source used and the irradiation time. Therefore, if the light source ON time is kept constant, the amount of light received and the light output of the light source are proportional to each other. A portion of a negative film corresponding to a large character has a high transmittance and receives a large amount of light. However, a portion of such a negative film corresponding to a small character has a low transmittance, and therefore receives a small amount of light. For this reason, when an image including both a large character and a small character is read by a CCD and an analog image signal is obtained, the analog image signal has a wide dynamic range. Therefore, when the analog image signal obtained from the CCD and a fixed slice level are compared to obtain a digital signal, a tip of a large character is rounded, and a small character may vanish altogether. When such a signal is used for image reproduction, the quality of the reproduced image is low.

SUMMARY OF THE INVENTION

It is an object of the present invention to provide an image processing apparatus which is free of the drawbacks of the conventional apparatuses and which can correctly digitize an image so that the quality of a reproduced character, for example, is improved.

It is another object of the present invention to provide an image processing apparatus which can determine a threshold level or a slice level for digitization which is suitable for changes in a specific analog signal.

It is still another object of the present invention to provide an image processing apparatus which is suitable for digitization of an image including various different image portions.

It is still another object of the present invention to provide an image processing apparatus which is suitable for readout of a microfilm.

The above and other objects, features and advantages of the present invention will become more apparent from the following description taken in conjunction with the accompanying drawings.

DETAILED DESCRIPTION OF THE PREFERRED EMBODIMENT:

The preferred embodiment of the present invention will now be described in detail with reference to the accompanying drawings.

Figure 1:
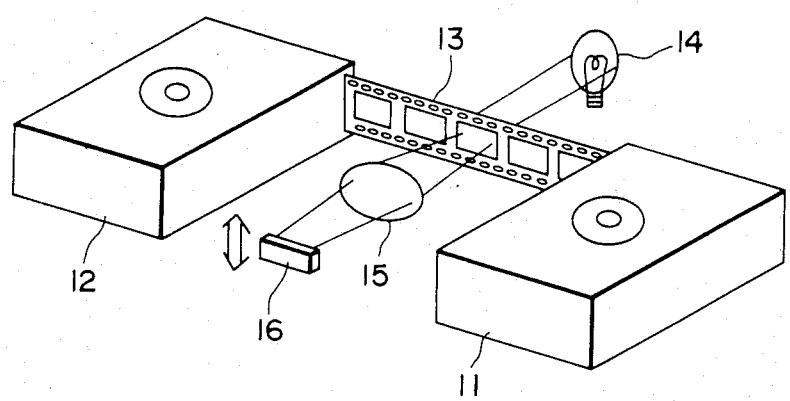
FIG. 1 shows the configuration of a microfilm reader to which the present invention is applied.

FIG. 1 shows the configuration of a microfilm reader to which the present invention may be applied. A strip-like microfilm 13 stored in a microfilm cartridge 11 is fed by a drive system (not shown) and is taken up by a subcartridge 12. Thus, a desired frame of the microfilm 13 is set at a read position. The microfilm 13 fed from the cartridge 11 is irradiated with light from a light source 14. Light which is transmitted through the microfilm 13 exposes a photosensitive surface of a CCD 16 through a lens 15. The CCD 16 produces an electrical signal in accordance with the intensity of incident light. The CCD 16 is moved in the direction indicated by the arrow and photoelectrically reads image information of one frame of the microfilm 13.

Figure 2:
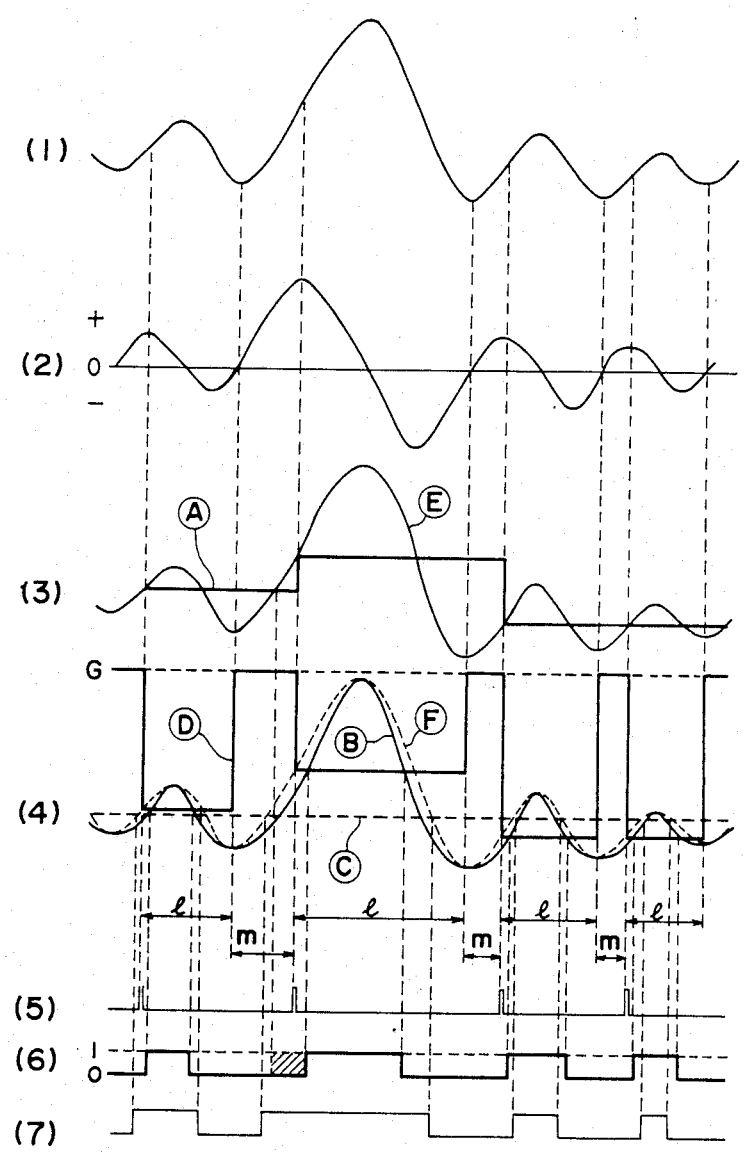
FIG. 2 is a timing chart for explaining the principle of the present invention.
Figure 3:
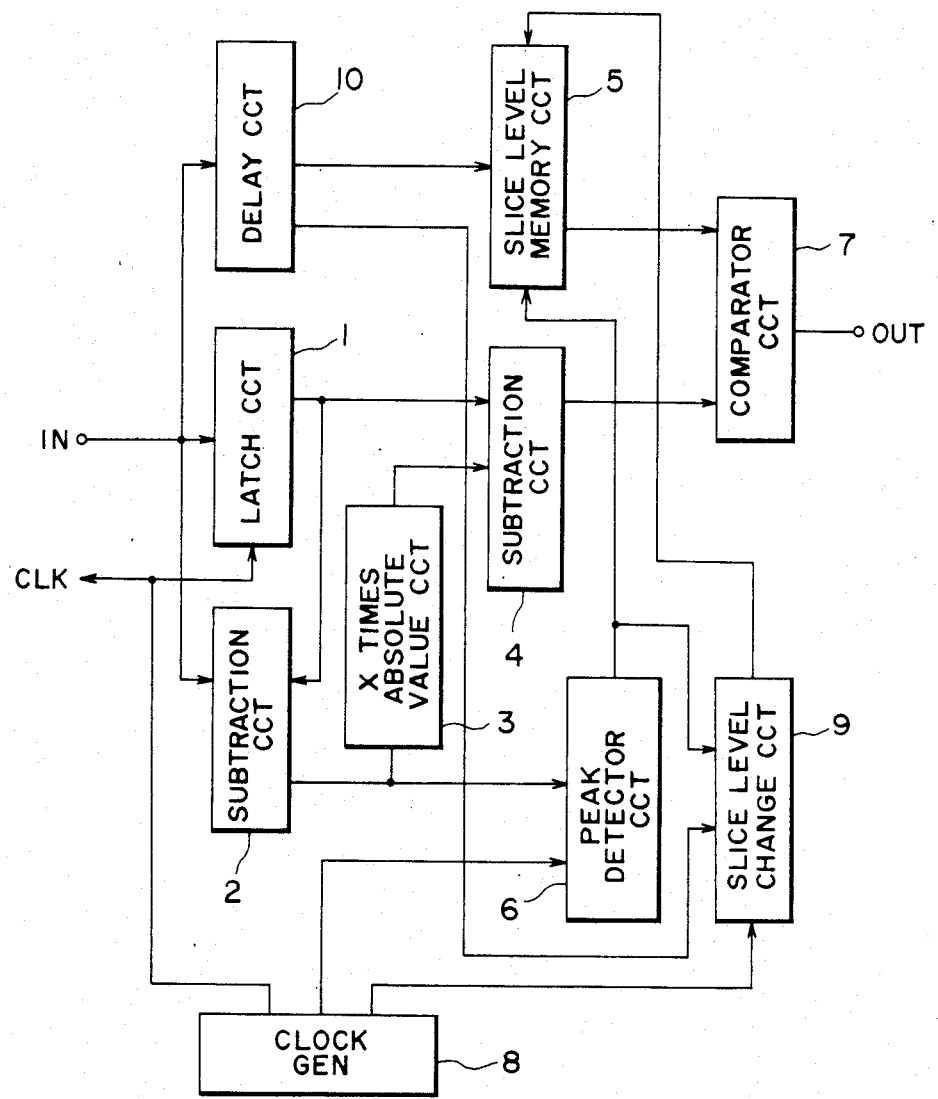
FIG. 3 is a block diagram of an embodiment of the present state.

FIG. 2 is a timing chart for explaining the mode of operation of the present invention. FIG. 3 is a block diagram of an embodiment of a digitizing circuit according to the principle described with reference to FIG. 2. A description will first be made with reference to FIG. 2. FIG. 2(1) shows the waveform of an analog image signal obtained by photoelectric conversion by the CCD 16. The slope of the waveform (1) is obtained, and has a waveform as shown in (2). A positive peak (maximum value) of the waveform (2) is detected as shown in a waveform (5). The analog image signal at the position corresponding to this peak value is stored. The stored signal has a level substantially intermediate along the range of changes in the analog image signal and is updated upon detection of each positive peak value of the waveform (2). The resultant signal is a signal (A) in the waveform (3). A signal (E) in the waveform (3) is an analog signal having the waveform (1). When the absolute value of the signal of the waveform (2) is subtracted from the analog image signal of the waveform (1), a signal (B) indicated by the solid line in the waveform (4) is obtained. A signal (F) indicated by the dotted line in the waveform (4) is an analog signal of the waveform (1). The signal (B) of the waveform (4) and the signal (A) of the waveform (3) are compared, and the condition (B) ≧ (A) is defined as "1" and the condition (B) < (A) is defined as "0". Then, a signal (6) is obtained, which is an objective digital image signal. The signal (6) is obtained such that a digitization error at a point of change from a signal of small amplitude to a signal of large amplitude is corrected. A signal which is obtained by comparing a signal C of a fixed slice level with an original analog image signal (1) (dotted waveform shown in the waveform (4)) as in the conventional case is illutrated in (7). As may be apparent from the signals (6) and (7), according to the present invention, analog signals of small and large amplitudes can both be correctly digitized. In addition, the amplitude of a digital signal at the portion of large amplitude is narrow as compared to that obtained with a fixed slice level. Therefore, thickening of a character having a high transmittance (a large character on a negative film) can be prevented.

Referring to FIG. 3, a block diagram according to an embodiment of the present invention will be described. An N-bit digital signal IN is obtained by A/D conversion with a known A/D converter of an analog image signal obtained from the CCD 16. The digital signal IN is stored in a latch circuit 1. A subtraction circuit 2 calculates the difference between the signal stored in the latch circuit 1 and the next input signal. The latch circuit 1 and the subtraction circuit 2 constitute a circuit for calculating the slope of the image signal.

An output from the subtraction circuit 2 is supplied to a peak detector circuit 6 so as to detect a position on the time base of a peak value of the output from the subtraction circuit 2. A memory circuit 5 stores the input image signal at the detected time position in response to a pulse signal corresponding to the peak value of the slope of the image signal obtained from the peak detector circuit 6. This memory circuit is a circuit for storing or holding a slice level as a comparison reference value for the image signal, i.e., slice level memory circuit 5 shown in FIG. 3.

An X times absolute value circuit 3 multiplies by X the slope of the image signal from the subtraction circuit 2 and calculates its absolute value. A subtraction circuit 4 subtracts an output from the X times absolute value circuit 3 from an output from the latch circuit 1. The X times absolute value circuit 3 is incorporated so as to obtain a suitable digital output signal and has the function of preventing thickening of a reproduced character and to control the image quality.

A comparator 7 compares an output signal from the subtraction circuit 4 with an output signal read out from the slice level memory circuit 5. The comparator 7 produces a digital image signal.

A slice level, or threshold level, change circuit 9 detects an effective slice level region 1 excluding an interval m from a minimum value of the input image signal (1) to the next maximum value of the slope signal (2). The circuit 9 then corrects to a fixed reference value (i.e., forcibly changes to a fixed slice level G in the waveform (4) in FIG. 2) a slice level A in the interval m from the minimum value of the input image signal (1) to the maximum value of the slope signal (2). The incorporation of the circuit 9 can provide the following effect. At a portion at which a change from a signal of small amplitude to a signal of large amplitude occurs, a peak value of the slope appears at a delayed time. For this reason, erroneous detection of the signal of large amplitude as a digital signal output (hatched portion in the waveform (6)) in accordance with the slice level of the signal of small ampltiude can be prevented. As a result, the output signal from the slice level memory circuit 5 which is obtained in consideration of a change signal from the slice level change circuit 9 becomes a signal D of the waveform (4).

A delay circuit 10 serves to delay the input image signal and stores the delayed signal in the slice level memory circuit 5 in synchronism with the output from the subtraction circuit 4. A clock generator 8 generates clock signals for controlling the operation timing of the overall circuit.

The above embodiment is described with reference to a microfilm. However, the present invention is similarly applicable to reproduction of normal films, in a facsimile system or a copying machine, and the like.

According to the present invention, a maximum value of a slope of an analog image signal is detected, and an image signal corresponding to the detected maximum value is used as a reference signal for digitization. Therefore, the digitization reference signal can be set at substantially the intermediate level of the image signal at all times. Therefore, the reference signal will not be deviated from the range of changes in the image signal unlike the case wherein the input analog image signal is digitized with reference to a fixed reference signal.

Since a changing image signal always has a peak value of a slope, this can be detected, allowing determination of a digitization reference signal which always corresponds to changes in the input image signal.

When the polarity of the analog signal is the opposite of that in the case described above, a minimum value of the slope is detected, and an image signal corresponding to the detected minimum value can be used as a reference signal.

According to the present invention, with a simple circuit configuration, a reference signal for digitizing an analog image signal can be made always to correspond to changes in the analog image signal.

The problem of thickening of a digital signal corresponding to a line of a character upon digitization of an analog image signal is prevented. When the resultant digital image signal is used for image reproduction, an excellent image can be reproduced.

When an image signal changes from a signal of small amplitude to a signal of large amplitude, the image signal can be digitized with reference to a reference signal which is determined for the signal of small amplitude in conventional cases. The apparatus of the present invention is free from this problem and allows excellent digitization.

Although the present invention is described with reference to a particular preferred embodiment thereof, the present invention is not limited thereto. Various changes and modifications may be made within the spirit and scope of the present invention.

What is claimed is:

1. An image signal processing apparatus comprising:
   means for inputting an analog image signal;
   means for detecting a peak of the slope of the input analog image signal;
   means for holding the input analog image signal corresponding to the detected peak of the slope of the input analog image signal; and
   means for binary encoding the input analog image signal using as a threshold signal the analog image signal held by said holding means.

2. An apparatus according to claim 1, wherein said binary encoding means includes means for comparing the threshold signal with the analog image signal.

3. An apparatus according to claim 1, wherein said detecting means detects a positive or negative peak of the slope of the input analog image signal.

4. An apparatus according to claim 1, wherein said inputting means includes read means for reading an image by photoelectric conversion and generating an analog image signal.

5. An apparatus according to claim 1, wherein said detecting means includes means for obtaining the slope of the input analog image signal.

6. An image signal processing apparatus comprising:
means for inputting an analog image signal;
first generating means for generating a variable threshold signal for binary encoding in accordance with the input analog image signal;
second generating means for generating a fixed threshold signal for binary encoding of the input analog image signal into a predetermined binary signal;
means for selecting one of the variable threshold signal and the fixed threshold signal in accordance with the input analog image signal; and
means for binary encoding the input analog image signal in accordance with the selected threshold signal.

7. An apparatus according to claim 6, wherein said selecting means selects the fixed threshold signal in a region within which the analog image signal changes from a small amplitude to a large amplitude.

8. An apparatus according to claim 6, wherein said inputting means includes read means for reading an image by photoelectric conversion, and generating an analog image signal.

9. An apparatus according to claim 6, wherein said first generating means generates the variable threshold signal in accordance with a slope of the input analog signal.

10. An image processing apparatus comprising:
means for inputting an analog image signal;
means for detecting a rate of change in the input analog image signal;
means for modifying the slope of the input analog image signal in accordance with the detected rate of change; and
means for binary encoding of the modified analog image signal.

11. An apparatus according to claim 10, wherein said modifying means modifies the slope of the input analog image signal in accordance with an absolute value of the rate of change.

12. An apparatus according to claim 10, wherein said binary encoding means comprises means for comparing the analog image signal with a threshold signal for binary encoding.

13. An apparatus according to claim 12, wherein said binary encoding means is operable to generate the threshold signal on the basis of the analog image signal.

14. An apparatus according to claim 10, wherein said inputting means includes read means for reading an image by photoelectric conversion and generating an analog image signal.

15. An apparatus according to claim 10, whereing said modifying means is operable to perform subtraction for the analog image signal using a value based on the detected rate of change.

16. An image signal processing apparatus comprising:
means for inputting an image signal;
means for detecting a peak of the slope of the input image signal;
means for holding an image signal corresponding to the detected peak of the slope of the input image signal; and
means for comparing the input image signal with the image signal held by said holding means.

17. An apparatus according to claim 16, wherein said detecting means detects a positive or negative peak of the slope of the input image signal.

18. An apparatus according to claim 16, wherein said inputting means includes read means for reading an image by photoelectric conversion and generating an image signal.

19. An apparatus according to claim 16, wherein said detecting means includes means for obtaining the slope of the input image signal.

20. An image signal processing apparatus comprising:
means for inputting an image signal;
first generating means for generating a variable threshold signal for binary encoding in accordance with the input image signal;
second generating means for generating a fixed threshold signal for binary encoding of the input image signal into a predetermined binary signal;
means for selecting one of the variable threshold signals and the fixed threshold signal in accordance with the input image signal; and
means for comparing the input image signal with the selected threshold signal;

21. An apparatus according to claim 20, wherein said selecting means selects the fixed threshold signal in a region within which the input image signal changes from a small amplitude to a large amplitude.

22. An apparatus according to claim 20, wherein said inputting means includes read means for reading an image by photoelectric conversion, and generating an image signal.

* * * * *